US012574730B2

(12) United States Patent
Zhang et al.

(10) Patent No.: US 12,574,730 B2
(45) Date of Patent: Mar. 10, 2026

(54) METHOD AND SYSTEM FOR ACCESS AND COMMUNICATION CONTROL OF SIM-LESS END DEVICES

(71) Applicant: Verizon Patent and Licensing Inc., Basking Ridge, NJ (US)

(72) Inventors: Ning Zhang, Warren, NJ (US); Ye Huang, San Ramon, CA (US); Umesh Kumar Gupta, Morris Plains, NJ (US); Dayong He, Bridgewater, NJ (US); Jyotsna Kachroo, Millburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 279 days.

(21) Appl. No.: 18/334,088

(22) Filed: Jun. 13, 2023

(65) Prior Publication Data

US 2024/0422541 A1 Dec. 19, 2024

(51) Int. Cl.
*H04L 29/06* (2006.01)
*H04W 12/069* (2021.01)
*H04W 12/69* (2021.01)

(52) U.S. Cl.
CPC ......... *H04W 12/069* (2021.01); *H04W 12/69* (2021.01)

(58) Field of Classification Search
CPC .... H04W 12/069; H04W 12/69; H04L 63/08; H04L 63/0823; H04L 63/0876
See application file for complete search history.

(56) References Cited

U.S. PATENT DOCUMENTS

2016/0261596 A1* 9/2016 Khello ................. H04W 12/08
2024/0430239 A1* 12/2024 Wang ..................... H04L 69/18

* cited by examiner

*Primary Examiner* — Joseph P Hirl
*Assistant Examiner* — Chi D Nguy

(57) ABSTRACT

A method, a network device, and a non-transitory computer-readable storage medium are described in relation to an intelligent secure access for SIM-less end device service. The intelligent secure access for SIM-less end device service may include providing authentication and/or authorization of SIM-less end devices and an intermediary network device or intermediary customer premises equipment. The intelligent secure access for SIM-less end device service may include validation of an identity of the SIM-less devices and the intermediary network device or intermediary customer premises equipment as well as applications of the SIM-less devices for access and use of an application service layer network.

20 Claims, 9 Drawing Sheets

100

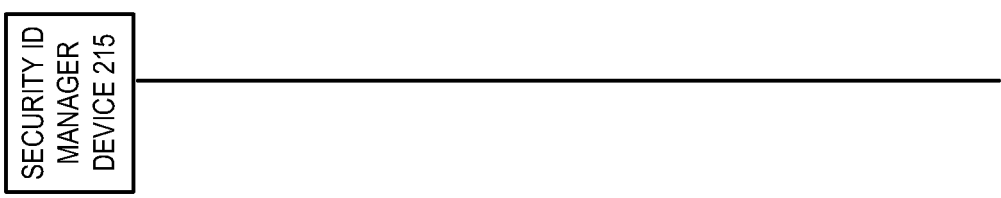
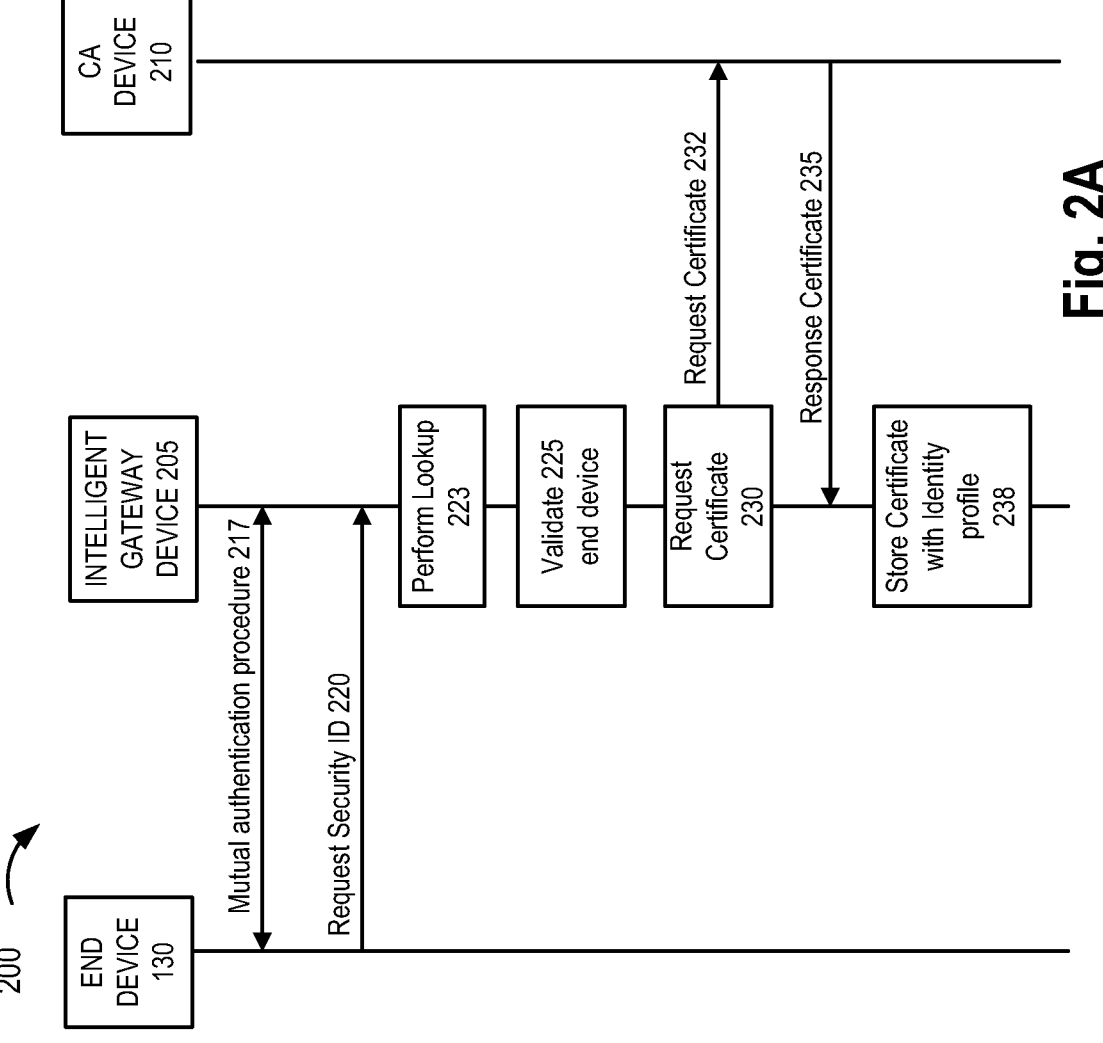
Fig. 2A

600

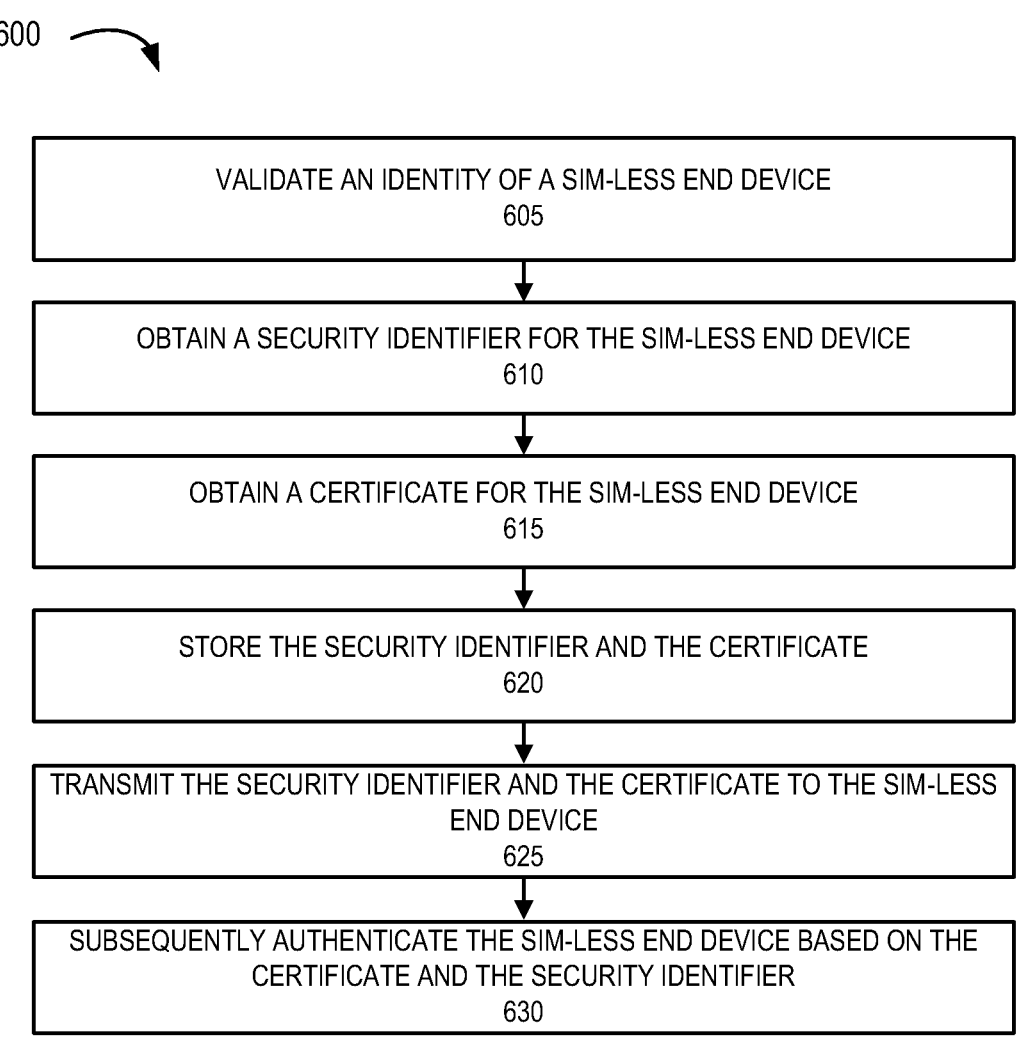

VALIDATE AN IDENTITY OF A SIM-LESS END DEVICE
605

OBTAIN A SECURITY IDENTIFIER FOR THE SIM-LESS END DEVICE
610

OBTAIN A CERTIFICATE FOR THE SIM-LESS END DEVICE
615

STORE THE SECURITY IDENTIFIER AND THE CERTIFICATE
620

TRANSMIT THE SECURITY IDENTIFIER AND THE CERTIFICATE TO THE SIM-LESS
END DEVICE
625

SUBSEQUENTLY AUTHENTICATE THE SIM-LESS END DEVICE BASED ON THE
CERTIFICATE AND THE SECURITY IDENTIFIER
630

Fig. 6

700
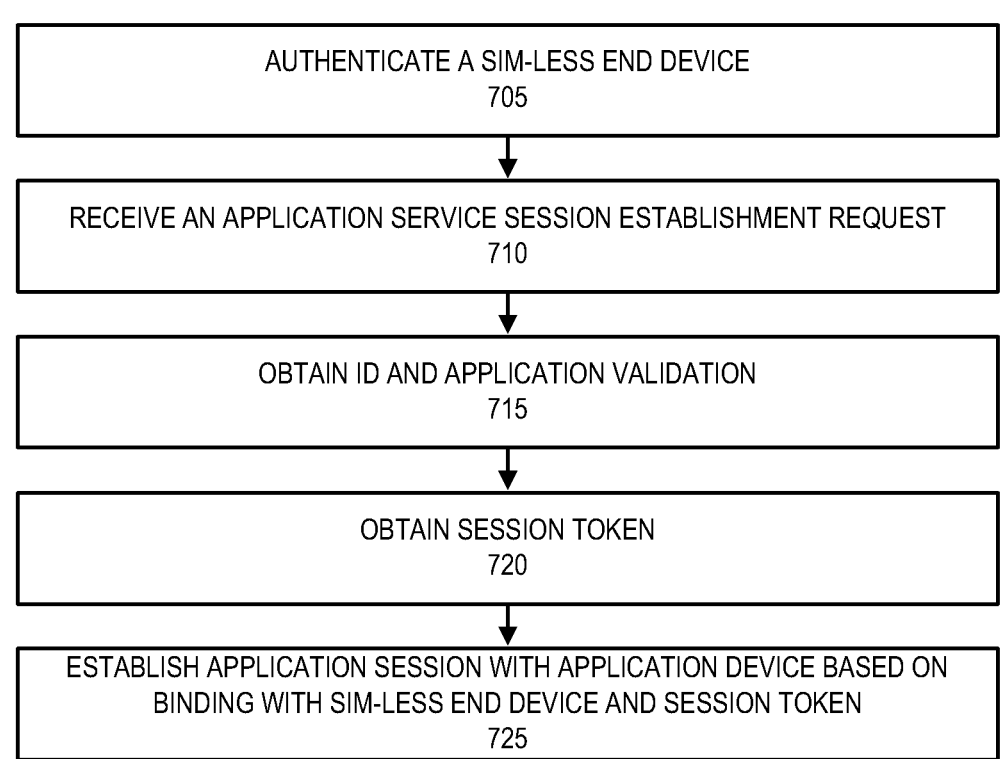
AUTHENTICATE A SIM-LESS END DEVICE
705
RECEIVE AN APPLICATION SERVICE SESSION ESTABLISHMENT REQUEST
710
OBTAIN ID AND APPLICATION VALIDATION
715
OBTAIN SESSION TOKEN
720
ESTABLISH APPLICATION SESSION WITH APPLICATION DEVICE BASED ON BINDING WITH SIM-LESS END DEVICE AND SESSION TOKEN
725
Fig. 7

METHOD AND SYSTEM FOR ACCESS AND COMMUNICATION CONTROL OF SIM-LESS END DEVICES

BACKGROUND

Development and design of networks present certain challenges from a network-side perspective and an end device perspective. For example, Next Generation (NG) wireless networks, such as Fifth Generation New Radio (5G NR) networks are being deployed and are under development. Typically, end devices are authorized and/or authenticated as a part of network attachment and/or use of an application service.

BRIEF DESCRIPTION OF THE DRAWINGS

FIGS. 2A and 2B are diagrams illustrating an exemplary environment in which an exemplary process of an exemplary embodiment of the intelligent secure access for SIM-less end device service may be implemented;

FIG. 6 is a flow diagram illustrating an exemplary process of an exemplary embodiment of the intelligent secure access for SIM-less end device service; and FIG. 7 is a flow diagram illustrating another exemplary process of an exemplary embodiment of the intelligent secure access for SIM-less end device service.

DETAILED DESCRIPTION

Figure 1:
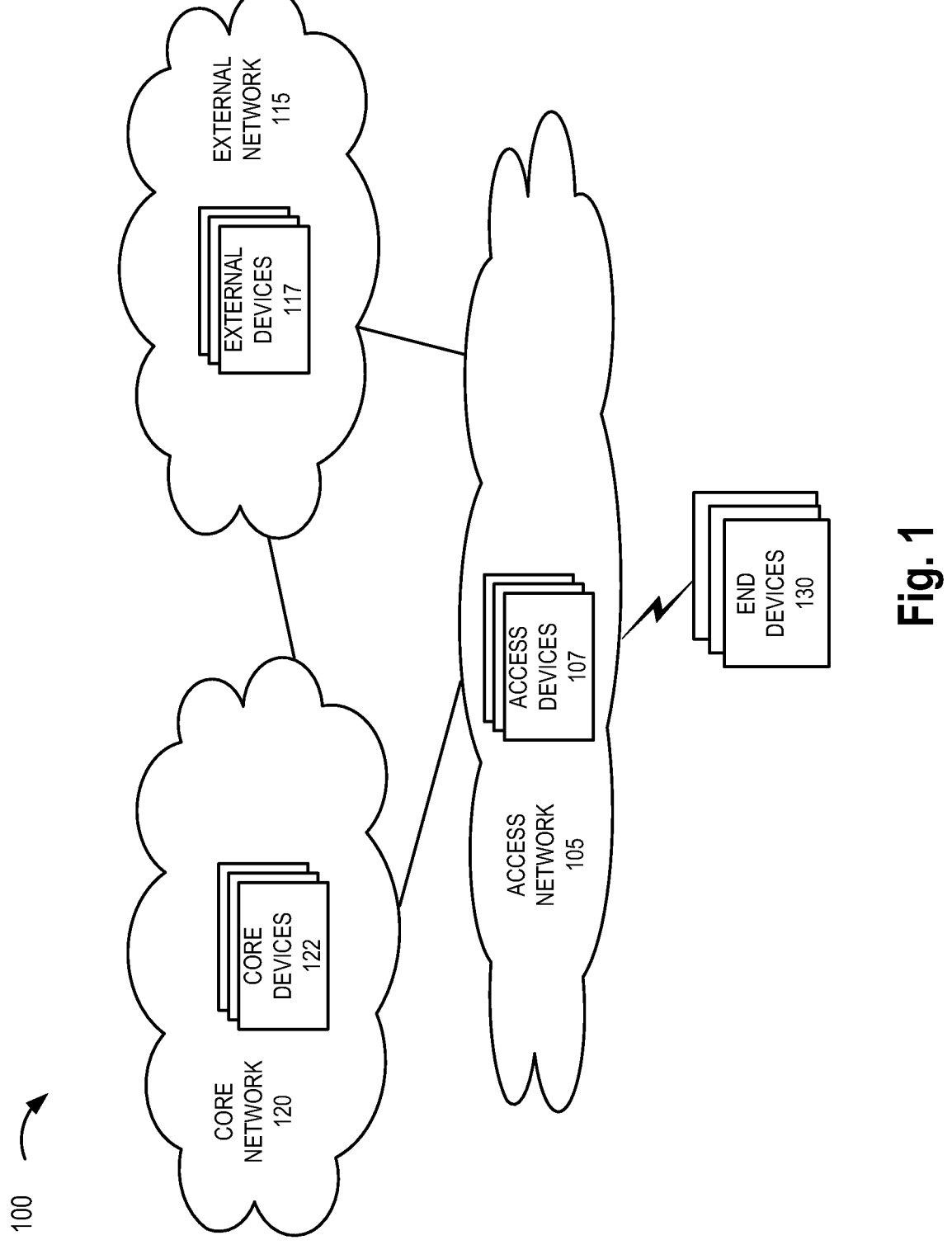
FIG. 1 is a diagram illustrating an exemplary environment in which an exemplary embodiment of an intelligent secure access for SIM-less end device service may be implemented.

The following detailed description refers to the accompanying drawings. The same reference numbers in different drawings may identify the same or similar elements. Also, the following detailed description does not limit the invention.

A wide range of wireless end devices, which may vary in capabilities, configuration, and so forth, may access and connect to a network. For example, some wireless end devices may include subscriber identification module (SIM) cards, eSIM card/chips, Universal Integrated Circuit Cards (UICCs), embedded UICCs, secure elements (SEs), integrated trusted execution environments (TEEs), chips or the like (also referred to, described, or defined simply as a "card"), which may include hardware and may include various types of data, an application, software, an operating system (OS), and/or other types of executables, such as SIMs, embedded SIMs (eSIMs), Universal SIMs (USIMs), integrated SIMs (iSIMs), and/or a similar type of application, software, and/or executable (also referred to, described, or defined simply as a "USIM") that may be stored on and executed by the card, for example, while other types of wireless end devices may not include a card and/or USIM. Further, some wireless devices may not have cellular connectivity capabilities. For example, a cardless/USIM-less wireless device may connect to the network via other wireless technologies and/or intermediary network devices, such as for example, Wi-Fi, Bluetooth, Zigbee, Ethernet, Ultra-wideband (UWB), a wireless router, a firewall, a gateway device, a Wi-Fi device, a Bluetooth device, a Zigbee device, a UWB device, an Ethernet device, another type of non-cellular wireless technology, and so forth.

When a cardless/USIM-less wireless end device attempts to connect, access, and/or use an application service of an application service layer network (e.g., a cloud network, a multi-access edge computing (MEC) network, or another type of network that provides an application service), typically the application service layer network may apply security measures (e.g., authentication, authorization, etc.) that may include validating the identity of the cardless/USIM-less wireless device, validating version information about hardware (e.g., a media access control (MAC) address, etc.) and software (e.g., applications, etc.), and other procedures to manage access and provide secure communications between the application service layer network, an application service layer network device (e.g., an application server or another type of network device that may host an application service, an asset, or the like), and the cardless/USIM-less wireless device.

Currently, however, there are no end-to-end authentication and/or authorization measures imposed when the cardless/USIM-less wireless end device connects, accesses, and/or uses the application service of a MEC network, a cloud network, or another type of application service layer network, for example. Rather, at most, the intermediary network device (e.g., the Wi-Fi device, the Bluetooth device, a non-cellular access point, etc.) may register with the network as a trusted network device (e.g., based on a card/USIM or the like) but there is no authentication and/or authorization measures for the cardless/USIM-less wireless end device in relation to radio access network (RAN), a core network, and/or the application service layer network. As such, there are security risks involved due to the lack of authentication and/or authorization measures for the cardless/USIM-less wireless end device for any network that is included in an end-to-end network path between the cardless/USIM-less wireless end device and the application service layer network device of the application service layer network.

According to exemplary embodiments, an intelligent secure access for SIM-less end device service is described herein. According to an exemplary embodiment, the intelligent secure access for SIM-less end device service provides intelligent secure access for end devices that are card-less and/or USIM-less (referred to, described, or defined as simply as "SIM-less end device"). The SIM-less end device may or may not have cellular connectivity capabilities. According to an exemplary embodiment, an intelligent network device includes logic of an exemplary embodiment of the intelligent secure access for SIM-less end device service. For example, the intelligent network device may be implemented to include a gateway device or customer premises equipment (CPE). The intelligent network device may be a SIM/USIM-based device.

According to an exemplary embodiment, the intelligent network device may include artificial intelligence and/or machine learning (AI/ML) logic that may learn and/or build an identity profile for the SIM-less end device. For example, as a part of a first or initial on-boarding procedure, the intelligent network device may use base information associated with the SIM-less end device (e.g., a media access control (MAC) address, a Bluetooth identifier, or another (unique) identifier) to generate an identity profile. The AI/ML logic of the intelligent network device may update and/or further build the identity profile based on modeling associated with similar types of SIM-less end devices and/or historical connectivity behavior. For example, depending on the type of SIM-less end device (e.g., Internet of Things (IoT) sensor, drone, smart camera, etc.), the AI/ML logic may determine or intelligently build the identity profile based on similar types of SIM-less end devices. The intelligent network device may also detect anomalies regarding network access, connections, application sessions, application services, and the like. Based on such detection, the intelligent network device may be configured to perform a remedial procedure, such as prevent connection, generate an alarm or alert, quarantine a harmful SIM-less end device, an application of the SIM-less end device, or the like.

According to an exemplary embodiment, the intelligent network device may provide device and application identification, application onboarding, and connection to an application service layer network, as described herein. For example, the intelligent secure access for SIM-less end device service may include an attestation service, as described herein. The attestation service may securely and uniquely identify, authenticate, and/or authorize a SIM-less end device and an application of the SIM-less end device based on an end device identifier, a security identifier, an application identifier, security credentials (e.g., digital signature, certificate, token, or the like) and/or the identity profile, as described herein, before the SIM-less end device connects to an application service layer network, for example, or participates in another type of data transaction, software/firmware update, or the like. The intelligent network device may grant full access to the SIM-less end device based on network-established criteria.

According to an exemplary embodiment, the intelligent secure access for SIM-less end device service may provide end-to-end authentication and/or authorization validation and application service connectivity based on a composite identifier, as described herein. For example, the composite identifier may include identifiers and tokens for both the SIM-less end device and the intelligent network device. By way of further example, the composite identifier may include an intelligent network device identifier, an intelligent network device identifier token, an intelligent network device application token, a SIM-less end device identifier, a SIM-less end device identifier token, and a SIM-less end device application token.

In view of the foregoing, the intelligent secure access for SIM-less end device service may enable access and secure end-to-end communication between application service layer networks and SIM-less end devices.

FIG. 1 is a diagram illustrating an exemplary environment 100 in which an exemplary embodiment of an intelligent secure access for SIM-less end device service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the intelligent secure access for SIM-less end device service may use at least one of these planes of communication.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a 4G or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved Long Term Evolution (eLTE) evolved Node B (eNB), an eNB, a radio network controller (RNC), a RAN intelligent controller (RIC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access CPE (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple radio access technologies (RATs) (e.g., 4G and 5G functionality, 5G and 5.5G functionality, etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

According to some exemplary embodiments, at least some of access devices 107 may include logic of an exemplary embodiment of a network-side intelligent secure access for SIM-less end device service. For example, these access devices 107 may generate and transmit a message to SIM-less end devices 130 and other network devices, as described herein, and perform other operations that facilitates an end-to-end validated connection with an application service layer network and network device via these access devices 107. According to an exemplary embodiment, these access devices 107 (also referred to as an intelligent network device) may be implemented as a gateway device or another suitable type of network device. According to an exemplary embodiment, these access devices 107 may establish a wireless connection with end devices 130 (e.g., a SIM-less end device 130) via a non-cellular wireless technology (e.g., Wi-Fi, Bluetooth, Zigbee, UWB, or the like). The intelligent network device may be a SIM/USIM-based device. For example, the intelligent network device may be configured with a unique (network) identifier (e.g., International Mobile Subscriber Identity (IMSI), an International Mobile Equipment Identity (IMEI), an Integrated Circuit Card Identifier (ICCID), a Subscription Permanent Identifier (SUPI) or the like), a key (e.g., authentication key, etc.), and logic that may support security and communication procedures.

According to an exemplary embodiment, the intelligent network device may validate an end device identifier of end device 130 (e.g., a SIM-less end device 130), obtain a digital certificate from a security device (e.g., a certificate authority (CA) device, etc.), and obtain a security identifier from a trusted network device (e.g., a security identifier management device, etc.), as described herein. According to an exemplary embodiment, the intelligent network device may establish a connection with an application service layer network and network device based on a composite identifier, as described herein. For example, the composite identifier may include identifiers and tokens for both the SIM-less end device and the intelligent network device. In this way, a combined endpoint (e.g., SIM-less end device 130 and intelligent network device) may be validated and trusted from a network-side perspective.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/ photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a security anchor function (SEAF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, a fixed wireless device, a router, a sensor, an automated guided vehicle (AGV), an industrial robot, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

According to an exemplary embodiment, at least some of end devices 130 include logic of an exemplary embodiment of an end device-side intelligent secure access for SIM-less end device service, as described herein. For example, these end devices 130 may generate and transmit messages to the intelligent network device, as described herein, and perform other operations that facilitates an end-to-end validated connection with an application service layer network and network device via the intelligent network device, as described herein. These end devices 130 may each include application that may be subject to the end device-side intelligent secure access for SIM-less end device service.

According to some exemplary embodiments, the intelligent network device, as described herein, may be implemented as CPE. According to such an embodiment, the intelligent network device may not be a network device of access network 105 (e.g., access device 107), as described elsewhere in this description.

Figure 2B:
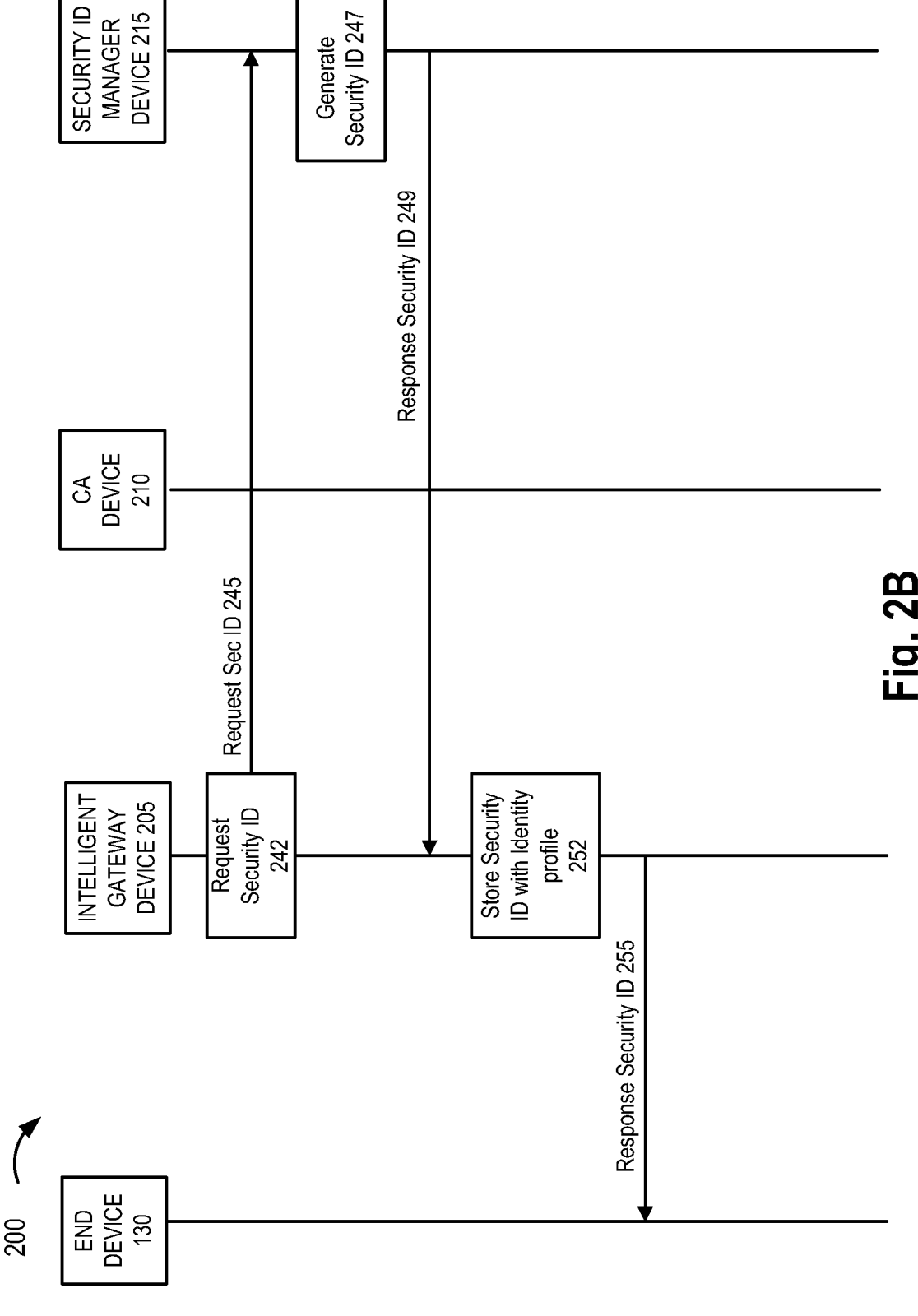

FIGS. 2A and 2B are diagrams illustrating an exemplary process 200 in which an exemplary embodiment of the intelligent secure access for SIM-less end device service may be implemented. As illustrated, according to an exemplary environment, the environment may include end device 130 (e.g., SIM-less end device 130), an intelligent gateway device 205, a CA device 210, and a security ID manager device 215. The environment may include other network devices (e.g., access device 107, core device 122, etc.) and networks (e.g., access network 105, core network 120, etc.), which have been omitted for the sake of brevity without compromising the description of process 200.

End device 130 has been described herein. For example, end device 130 may include a SIM-less end device. End device 130 may include end device-side logic of an exemplary embodiment of the intelligent secure access for SIM-less end device service. End device 130 may include at least one application that is subject to the intelligent secure access for SIM-less end device service.

Intelligent gateway device 205 may include a network device or CPE that may include network-side logic of an exemplary embodiment of the intelligent secure access for SIM-less end device service. For example, the intelligent network device, as described herein, may be implemented as intelligent gateway device 205.

CA device 210 may include a network device that may issue certificates, which may be used for validation purposes. For example, CA device 210 may issue digital certificates that may be used to authenticate devices (e.g., end device 130), users, code signing, and other types of certificates. For example, the digital certificate may be implemented as a Transport Layer Security (TLS)/Secure Socket Layer (SSL) certificate. CA device 210 may include logic that includes validating certificate requester information among other things. According to various exemplary embodiments, CA device 210 may be implemented as external device 117 or core device 122, be associated with a third party or not, and so forth. The digital certificate may facilitate authentication (e.g., validating identities) and bind the validated identities to cryptographic keys and enable a secure encrypted connection with data integrity.

Security ID manager device 215 may include a network device that dynamically binds end device 130 and intelligent gateway device 205 based on network authentication keys (e.g., derived from SIM primary keys). For example, security ID manager device 215 may generate a security identifier based on a device identifier of end device 130 (e.g., a MAC address, a serial number, or another type of non-SIM/USIM identifier) and a certificate of end device 130. Security ID manager device 215 may authenticate end device 130 based on the security identifier, as described herein. Additionally, security ID manager device 215 may include other logic that supports an exemplary embodiment of the intelligent secure access for SIM-less end device service, such as validating device identities, applications, and permissions, and obtaining tokens, as described herein.

Referring to FIG. 2A, end device 130 and intelligent gateway device 205 may perform a mutual authentication procedure 217. For example, the mutual authentication may be implemented as a certificate-based mutual authentication in which a trusted client CA certificate is provided to intelligent gateway device 205. According to this exemplary scenario, assume that the mutual authentication procedure was successful. Thereafter, end device 130 may request a security identifier 220 from intelligent gateway device 205. The request may include an end device identifier of end device 130. For example, the end device identifier may be implemented as a MAC address, a serial number, and/or another type of non-SIM/USIM unique identifier. In response to receiving the request, intelligent gateway device 205 may perform a lookup 223. For example, intelligent gateway device 205 may store information or has access to another device (not shown) that stores information that includes identifiers for end devices 130 that may be subject to the intelligent secure access for SIM-less end device service. For example, as described herein, intelligent gateway device 205 may build an identity profile for end devices 130 as a part of an onboarding process stemming from an initial attachment procedure. Intelligent gateway device 205 may compare the device identifier with the stored or accessible identity profile. Based on a result of the comparison, intelligent gateway device 205 may determine whether end device 130 is validated or not. When end device 130 is not validated, intelligent gateway device 205 may deny the request. Intelligent gateway device 205 may perform other procedures (e.g., alerts, alarms, limit connectivity, etc.).

According to this exemplary scenario, based on a result of the lookup 223, intelligent gateway device 205 may validate 225 end device 130. For example, the end device identifier included in the request may match an end device identifier included in an identity profile. In response to this determination, intelligent gateway device 205 may request a certificate 230 from CA device 210. For example, intelligent gateway device 205 may generate and transmit a request certificate 232 message to CA device 210. The request may include the end device identifier, for example. The request may include other types of information included in the identity profile.

In response to receiving the request 232, CA device 210 may assign or generate a certificate, and generate and transmit a response certificate 235 message to intelligent gateway device 205. For example, the response 235 may include a digital certificate. As illustrated, in response to receiving the response, intelligent gateway device 205 may store the certificate with the identity profile 238.

Referring to FIG. 2B, intelligent gateway device 205 may request a security identifier 242 from security ID manager device 215. For example, intelligent gateway device 205 may generate and transmit a request security identifier 245 message to security ID manager device 215. The request 245 may include the end device identifier of end device 130 and certificate information. In response to receiving the request 245, security ID manager device 215 may generate a security identifier 247 based on the request, and generate and transmit a response security identifier 249 message to intelligent gateway device 205. For example, the response 249 may include the security identifier. The security identifier may be a unique identifier.

As further illustrated, intelligent gateway device 205 may store the security identifier with the identity profile 252 of end device 130. Intelligent gateway device 205 may generate and transmit a response security identifier 255 message to end device 130. The response 255 may include the security identifier.

Figure 2C:
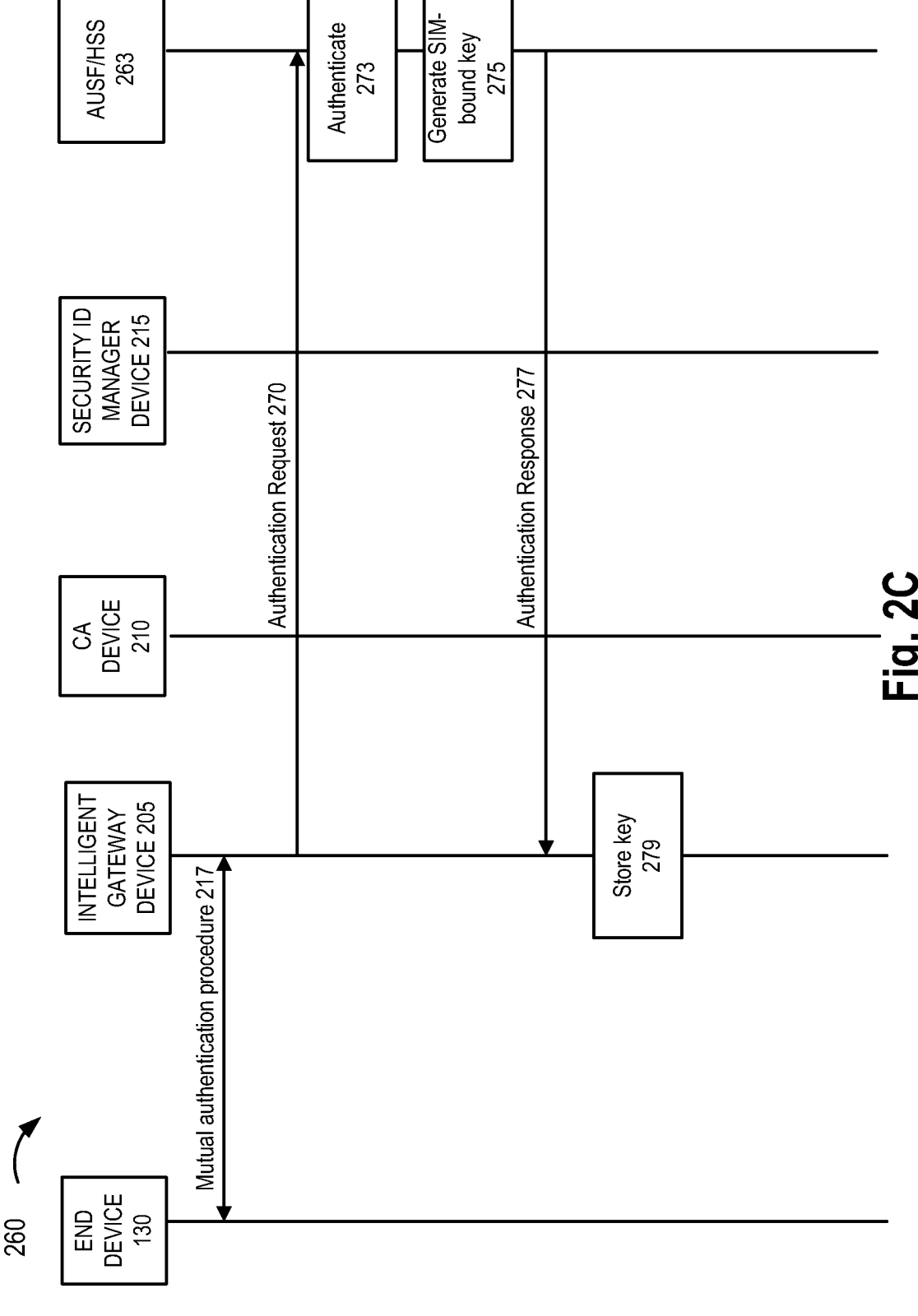
FIG. 2C is a diagram illustrating an exemplary environment in which another exemplary process of an exemplary embodiment of the intelligent secure access for SIM-less end device service may be implemented.

FIG. 2C is a diagram illustrating an exemplary process 260 in which an exemplary embodiment of the intelligent secure access for SIM-less end device service may be implemented. As illustrated, according to an exemplary environment, the environment may include end device 130 (e.g., SIM-less end device 130), intelligent gateway device 205, CA device 210, and security ID manager device 215. Additionally, the environment may include an AuSF and/or HSS (AuSF/HSS) 263. The environment may further include other network devices (e.g., access device 107, core device 122, etc.) and networks (e.g., access network 105, core network 120, etc.), which have been omitted for the sake of brevity without compromising the description of process 200.

End device 130, intelligent gateway device 205, CA device 210, and security ID manager device 215 have been described. AUSF/HSS 263 may include a network device that provides authentication services. For example, in a 4G scenario, the HSS may store credentials and may authenticate (e.g., an Evolved Packet System-Authentication and Key Agreement (EPS-AKA) authentication, or another type of authentication) devices. According to another example, in a 5G scenario, the AUSF may perform an authentication procedure (e.g., Extensible Authentication Protocol (EAP-AKA') or another 5G authentication procedure). The AUSF and/or the HSS may include functionalities and perform operations in accordance with a technical specification and/or standards body such as Third Generation Partnership Project (3GPP), 3GPP2, International Telecommunication Union (ITU), European Telecommunications Standards Institute (ETSI), GSM Association (GSMA), and the like. Additionally, according to an exemplary embodiment, the AUSF and/or the HSS may perform operations (e.g., authentication, etc.), which is non-standard (e.g., relative to 3GPP and the like). For example, the AUSF and/or the HSS may authenticate intelligent gateway device 205 as an end point.

Referring to FIG. 2C, as previously described, end device 130 and intelligent gateway device 205 may perform a mutual authentication procedure 217. In response, according to an exemplary scenario in which intelligent gateway device 205 has not already been authenticated with the network (e.g., access network 105, core network 120, and/or external network 115), intelligent gateway device 205 may generate and transmit an authentication request 270 to AUSF/HSS 263. The authentication request may include a SIM-based identifier or another type of unique identifier (e.g., an IMSI, a SUPI, a Globally Unique Temporary Identifier (GUTI), a Subscription Concealed Identifier (SUCI), a serving network (SN) identifier, or the like). In response to receiving the authentication request, AUSF or HSS 263 may authenticate 273 intelligent gateway device 205. For example, the AUSF may perform a 5G-based authentication procedure, or the HSS may perform a 4G-based authentication procedure, as described herein. According to an exemplary scenario, assume the authentication procedure is successful, and intelligent gateway device 205 is authenticated.

Based on the successful authentication, AUSF/HSS 263 may generate a SIM-bound key 275, and generate and transmit an authentication response 277 to intelligent gateway device 205. For example, the authentication response may include a key (e.g., a SIM-bound or based key, etc.) for intelligent gateway device 205. Intelligent gateway device 205 may store 279 the SIM-bound key and use for subsequent communications with the network.

Figure 3:
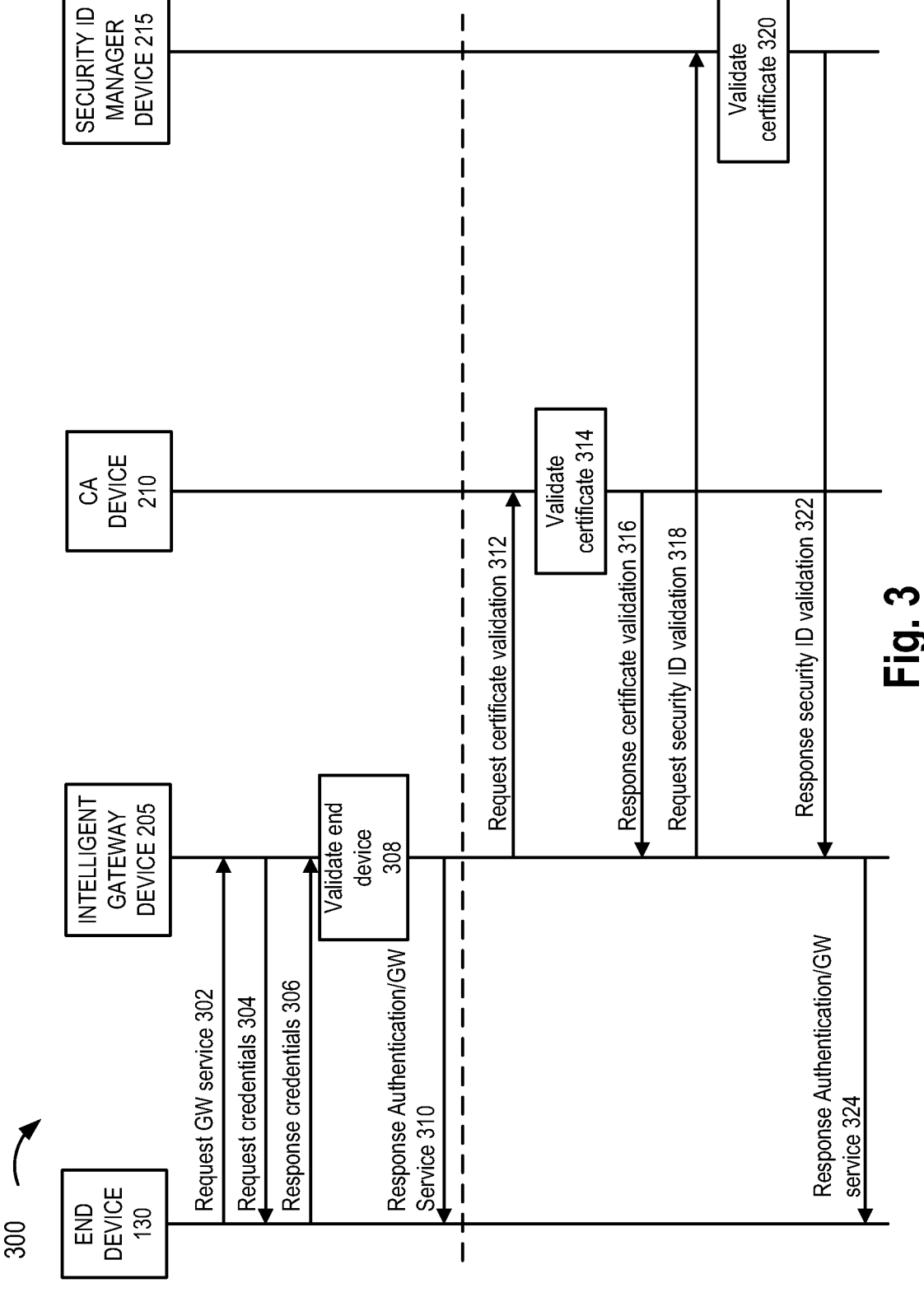
FIG. 3 is a diagram illustrating yet another exemplary process in which an exemplary embodiment of the intelligent secure access for SIM-less end device service may be implemented.

FIG. 3 is a diagram illustrating yet another exemplary process 300 in which an exemplary embodiment of the intelligent secure access for SIM-less end device service may be implemented. As illustrated, the exemplary environment may include end device 130 (e.g., SIM-less end device 130), intelligent gateway device 204, CA device 210, and security ID manager device 215, which have already been described herein. The environment may include other network devices (e.g., access device 107, core device 122, etc.) and networks (e.g., access network 105, core network 120, etc.), which have been omitted for the sake of brevity without compromising the description of process 300. According to an exemplary embodiment, process 300 may occur after process 200 has been successfully completed.

Referring to FIG. 3, according to an exemplary embodiment, end device 130 may generate and transmit a request for a gateway (GW) service 302 to intelligent gateway device 205. For example, end device 130 may be triggered to establish an application session with an application layer network (not illustrated), and may be configured to initiate an authentication procedure before or as a part of an application session establishment procedure. In response to receiving request 302, intelligent gateway device 205 may generate and transmit a request for credentials 304 to end device 130. In response to receiving request 304, end device 130 may generate and transmit a response credentials 306 to intelligent gateway device 205. For example, response 306 may include the security identifier, as described in relation to FIG. 2B. Additionally, for example, response 306 may include other types of credentials and/or identifiers, such as a MAC address, a serial number, and/or another type of non-SIM/USIM unique identifier, and/or a certificate (e.g., a digital certificate), as described herein. In response to receiving response 306, intelligent gateway device 205 may perform a validation procedure 308. For example, intelligent gateway device 205 may compare the credentials to the identity profile of end device 130, which may be stored by or accessible to intelligent gateway device 205. According to this exemplary scenario, when the comparison yields a successful result of validation, intelligent gateway device 205 may generate and transmit a response authentication/GW service 310 to end device 130. For example, response 310 may indicate that end device 130 has been successfully authenticated. Response 310 may indicate that end device 130 is authorized to establish an application session via intelligent gateway device 205. Although not illustrated, according to another exemplary scenario, when end device 130 is not successfully validated, intelligent gateway device 205 may prohibit a prospective application session, and/or may perform other security-related and/or remedial measures, as described herein.

According to another exemplary embodiment and scenario, in response to receiving response credentials 306, intelligent gateway device 205 may generate and transmit a request certificate validation 312 to CA device 210. As an example, end device 130 may be a mobile end device, which may connect to another intelligent gateway device 205 that may not be provisioned with the identity profile of end device 130. According to some exemplary embodiments, intelligent gateway device 205 may, as a part of a handover procedure relative to end device 130, provision or transmit the identity profile of end device 130.

Referring to FIG. 3, as shown, intelligent gateway device 205 may have the certificate information and the security identifier validated by CA device 210 and security ID manager device 215, respectively. For example, in response to receiving request 312, CA device 210 may perform a validation procedure to the certificate included in response 306 and request 312. According to this exemplary scenario, the validation procedure was successful, and CA device 210 may generate and transmit a response certificate validation 316 to intelligent gateway device 205. In similar fashion, intelligent gateway device 205 may generate and transmit a request security identifier validation 318 to security ID manager device 215, security ID manager device 215 may validate the security identifier, which was included in response 306 and request 318, and upon a successful validation, security ID manager device 215 may generate and transmit a response security ID validation 322 to intelligent gateway device 205. In response to receiving successfully validations regarding response 316 and response 322, intelligent gateway device 205 may generate and transmit a response authentication GW service 324 to end device 130. Response 324 may be similar to response 310, as described herein.

According to other exemplary scenarios, when the certificate and/or the security identifier is not successfully validated, intelligent gateway device 205 may prohibit a prospective application session, and/or may perform other security-related and/or remedial measures, as described herein.

Figure 4:
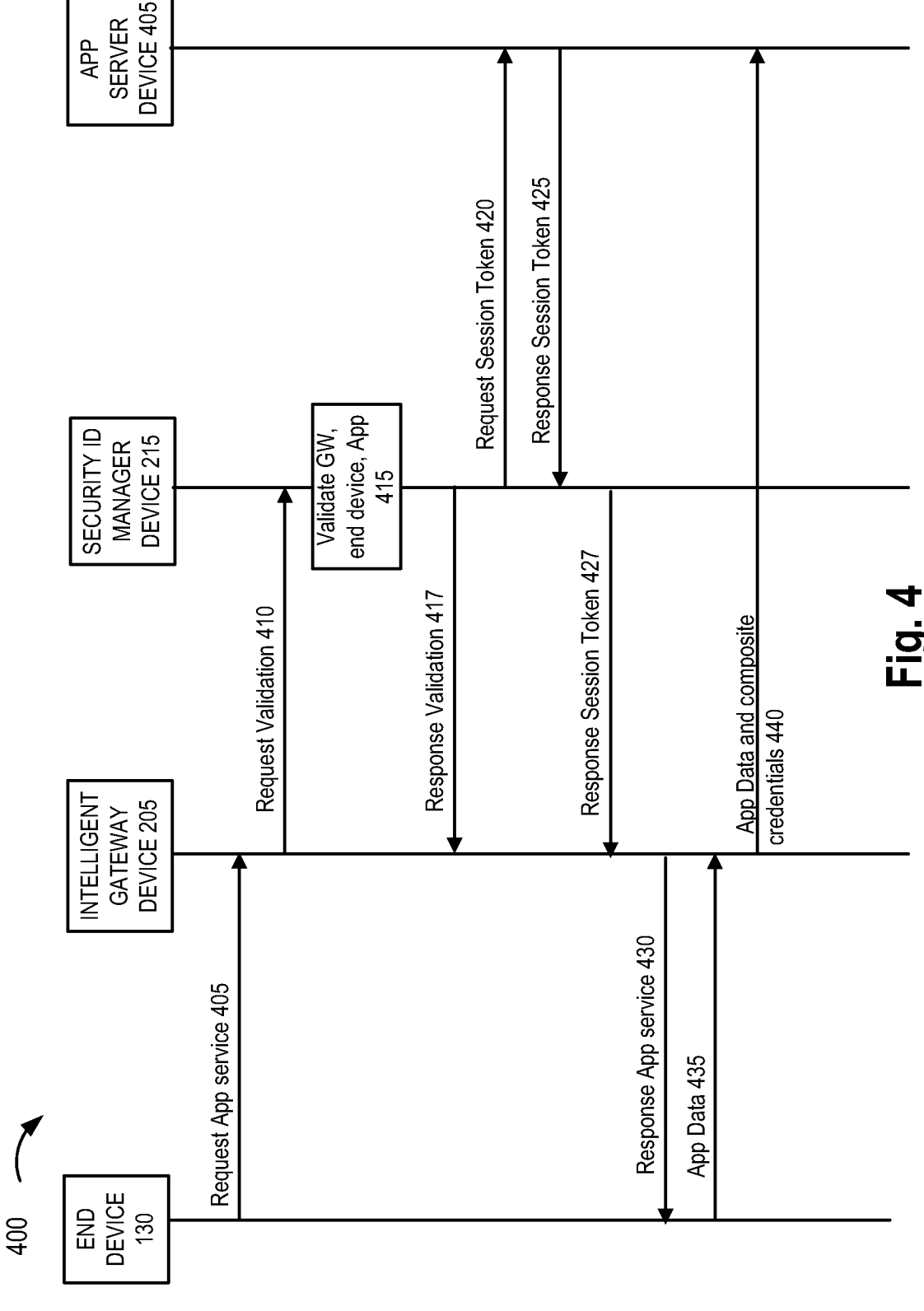
FIG. 4 is a diagram illustrating still another exemplary process in which an exemplary embodiment of the intelligent secure access for SIM-less end device service may be implemented.

FIG. 4 is a diagram illustrating still another exemplary process 400 in which an exemplary embodiment of the intelligent secure access for SIM-less end device service may be implemented. As illustrated, the exemplary environment may include end device 130 (e.g., SIM-less end device 130), intelligent gateway device 204, CA device 210, and security ID manager device 215, which have already been described herein. The exemplary environment may further include an application server device 405 (e.g., external device 117). The environment may include other network devices (e.g., access device 107, core device 122, external device 117, etc.) and networks (e.g., access network 105, core network 120, external network 115, etc.), which have been omitted for the sake of brevity without compromising the description of process 400.

Application server device 405 may be a network device (e.g., external device 117) that may host an application service and/or assets (e.g., end device application service or assets), as described herein. As described herein, application server device 405 may reside in an application service layer network (e.g., a MEC network, a cloud network, etc.). Application server device 405 may generate one or multiple types of tokens as a part of an establishment of an application service session with end device 130, as described herein. Application server device 405 may include policies and/or permissions pertaining to an application hosted by application service device 405 and end device(s) 130.

According to an exemplary embodiment, process 400 may occur after process 300 has been successfully completed. According to some exemplary embodiments, the validation of authentication and/or authorization of end device 130 may be time-limited and on a per intelligent gateway device 205 basis.

Referring to FIG. 4, end device 130 may generate and transmit a request for application service 405 to intelligent gateway device 205. For example, request 405 may include the security identifier and an application identifier that identifies an application of end device 130 to which request 405 pertains. Request 405 may include other identifiers or credentials, as described herein. In response to receiving request 405, intelligent gateway device 205 may generate and transmit a request validation 410 to security ID manager device 215. For example, request 410 may include an identifier of intelligent gateway device 205 (e.g., a GW identifier), a GW key (e.g., as described in relation to FIG. 2C), the security identifier, and the application identifier. Although not previous illustrated and described, security ID manager device 215 may be provisioned with the GW identifier, the GW key, and the application identifier based on communication with AUSF/HSS 263, intelligent gateway device 205, and/or another network device. End device 130 may be configured with one or multiple applications and may be assigned or have one or multiple application identifiers, respectively. In this way, an exemplary embodiment of the intelligent secure access for SIM-less end device service may authenticate and/or authorize an application session via intelligent gateway device 205 on a per end device 130 and application basis in addition to the trust and security afforded to intelligent gateway device 205 by the network (e.g., access network 105, core network 120, etc.), an application service layer network (e.g., external network 115), and so forth.

In response to receiving request 410 and based on request 410, security ID manager device 215 may validate intelligent gateway device 205, end device 130, and the application 415. For example, security ID manager device 215 may perform a lookup and compare the credentials included in request 410 with credential information stored by or accessible to security ID manager device 215. According to this exemplary scenario, security ID manager device 215 may successfully validate intelligent gateway device 205, end device 130, and the application, and in response generate and transmit a response validation 417. According to other exemplary scenarios when validation is unsuccessful, based on response validation 417, intelligent gateway device 205 may prevent the establishment of the application session, perform security and/or remedial measures, as described herein, for example.

As further illustrated, in response to the successful validation, security ID manager device 215 may generate and transmit a request session token 420 to application server device 405. Security ID manager device 215 may select application server device 405 based on the application identifier and/or other context information (e.g., location of intelligent gateway device, end device 130, subscription level of end device 130, etc.). According to an exemplary implementation, request 420 may include the GW identifier, the GW key, and the application identifier. According to other exemplary implementations, request 420 may include the security identifier and/or another unique identifier pertaining to end device 130.

In response to receiving request 420, application server device 405 may generate a token. For example, the token may be generated based on information included in request 420 (e.g., identifier, key, etc.). According to various exemplary embodiments, application server device 405 may generate multiple tokens, which may have differing time-to-lives (TTLs). For example, application server device 405 may generate an identifier token pertaining to intelligent gateway device 405 (GW ID token) based on the GW identifier and/or the GW key. According to another example, application server device 405 may generate an application token (App token) based on the application identifier and/or other information included in request 420. According to yet another example, application server device 405 may generate an end device token based on the security identifier, another type of unique identifier of end device 130, and/or other information included in request 420. In response to the generation of the token, application server device 405 may generate and transmit a response session token 425, which may include one or multiple tokens, to security ID manager device 215.

In response to receiving response 425, security ID manager device 215 may generate and transmit a response session token 427 to intelligent gateway device 205. Response 427 may include one or multiple tokens, as described herein. In response to receiving response 427, intelligent gateway device 205 may generate and transmit a response application service 430. Response 430 may indicate authentication, authorization, and/or approval to establish the application service session with application server device 405 and the token. As further illustrated, in response, end device 130 may transmit application data 435 to intelligent gateway device 205, and intelligent gateway device 205 may forward the application data (e.g., associated with the application of end device 130) along with composite credentials 440 to application server device 405 during the application service session. The composite credentials may include the token or tokens, as described herein.

As illustrated, FIGS. 2A, 2B, 2C, 3, and 4 illustrate exemplary processes of the intelligent secure access for SIM-less end device service according to an exemplary scenario, however, according to other exemplary embodiments, the processes may include additional, fewer, and/or different operations than those depicted and described in relation to FIGS. 2A, 2B, 2C, 3, and 4. The messages illustrated and described are exemplary. Additionally, for example, there may be additional messaging that may be implemented which has been omitted simply for brevity sake.

Figure 5:
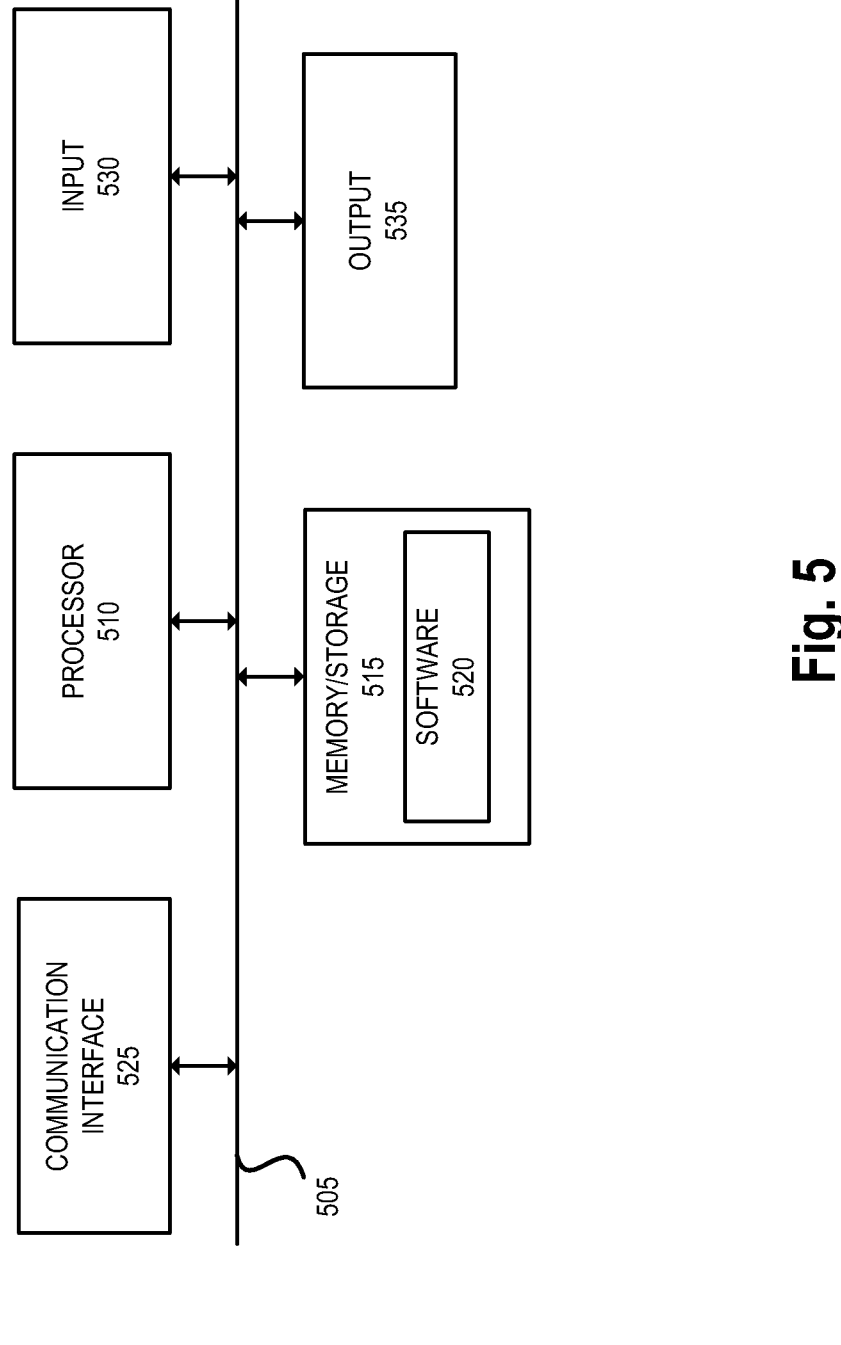
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to access device 107, external device 117, core device 122, end device 130, intelligent gateway device 205, CA device 210, security ID manager device 215, application server device 405, and/or other types of devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 515 may be external to and/or removable from device 500, such as, for example, a Universal Serial Bus (USB) memory stick, a dongle, a hard disk, mass storage, off-line storage, or some other type of storing medium. Memory/storage 515 may store data, software, and/or instructions related to the operation of device 500.

Software 520 includes an application or a program that provides a function and/or a process. As an example, with reference to intelligent gateway device 205, software 520 may include an application that, when executed by processor 510, provides a function and/or a process of the intelligent secure access for SIM-less end device service, as described herein. Additionally, for example, with reference to end device 130, software 520 may include an application that, when executed by processor 510, provides a function and/or a process of the intelligent secure access for SIM-less end device service, as described herein. Software 520 may also include firmware, middleware, microcode, hardware description language (HDL), and/or another form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces, optical interfaces, and/or wired interfaces. For example, communication interface 525 may include one or multiple transmitters and receivers, or transceivers. Communication interface 525 may operate according to a protocol stack and a communication standard.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 500 may be implemented in the same manner. For example, device 500 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 500 may be configured to perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 may be configured to perform a function or a process described herein based on the execution of hardware (processor 510, etc.).

FIG. 6 is a flow diagram illustrating an exemplary process 600 of an exemplary embodiment of the intelligent secure access for SIM-less end device service. According to an exemplary embodiment, a network device or CPE (e.g., an intelligent network device, such as intelligent gateway device 205) may perform process 600. According to an exemplary implementation, processor 510 executes software 520 to perform a step (in whole or in part) of process 600, as described herein. Alternatively, a step (in whole or in part) may be performed by execution of only hardware. For purposes of description, process 600 is described as performed by the intelligent gateway device 205. A step of process 600 has also been described and/or illustrated elsewhere in the description and other Figures.

Referring to FIG. 6, in block 605, intelligent gateway device 205 may validate an identity of a SIM-less end device 130, as described herein.

In block 610, intelligent gateway device 205 may obtain a security identifier for the SIM-less end device 130, as described herein, based on a successful validation of the identity of the SIM-less end device 130. In block 615, intelligent gateway device 205 may obtain a certificate for the SIM-less end device 130, as described herein. In block 620, intelligent gateway device 205 may store the security identifier and the certificate, as described herein.

In block 625, intelligent gateway device 205 may transmit the security identifier and the certificate to the SIM-less end device 130, as described herein. In block 630, intelligent gateway device 205 may subsequently authenticate the SIM-less end device 130 based on the certificate and the security identifier, as described herein.

FIG. 6 illustrates an exemplary process of the intelligent secure access for SIM-less end device service, however, according to other exemplary embodiments, the intelligent secure access for SIM-less end device service may perform additional operations, fewer operations, and/or different operations than those illustrated and described.

FIG. 7 is a flow diagram illustrating another exemplary process 700 of an exemplary embodiment of the intelligent secure access for SIM-less end device service. According to an exemplary embodiment, a network device or CPE (e.g., an intelligent network device, such as intelligent gateway device 205) may perform process 700. According to an exemplary implementation, processor 510 executes software 520 to perform a step (in whole or in part) of process 600, as described herein. Alternatively, a step (in whole or in part) may be performed by execution of only hardware. For purposes of description, process 700 is described as performed by the intelligent gateway device 205. A step of process 700 has also been described and/or illustrated elsewhere in the description and other Figures.

In block 705, intelligent gateway device 205 may authenticate a SIM-less end device 130, as described herein. In block 710, intelligent gateway device 205 may receive an application service session establishment request from the SIM-less end device 130, as described herein. In block 715, intelligent gateway device 205 may obtain identity and application validation, as described herein. For example, the identity validation may pertain to a validation of an identity associated with the SIM-less end device 130 and/or intelligent gateway device 205. The application validation may pertain to the application associated with the application service session establishment request (e.g., the application identifier that identifies an application of the SIM-less end device 130). The application validation may validate a permission of access and/or use of the application service relative to an application device, as described herein, for the SIM-less end device 130 and/or intelligent gateway device 205.

In block 720, intelligent gateway device 205 may obtain a session token, as described herein. For example, the session token may include one or multiple tokens. In block 725, intelligent gateway device 205 may establish the requested application service session with an application device based on a binding with the SIM-less end device 130 and the session token, as described herein. For example, with respect to the network (e.g., access network 105, core network 120) and/or an application service layer network (e.g., external network 115), an endpoint may be the combination of the SIM-less end device 130 and intelligent gateway device 205. Additionally, for example, with respect to the network, an application device (e.g., external device 117, application server device 405, etc.) may establish an application service session with SIM-less end device 130/intelligent gateway device 205 in which authentication and/or authorization may be at the device (e.g., SIM-less end device 130, intelligent gateway device 205) and application level.

FIG. 7 illustrates an exemplary process of the intelligent secure access for SIM-less end device service, however, according to other exemplary embodiments, the intelligent secure access for SIM-less end device service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIGS. 2A, 2B, 3, and 4, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a network device from a subscriber identification module (SIM)-less end device, an application service session establishment request with an application device of an external network, wherein the network device is customer premise equipment;
obtaining, by the network device in response to the receiving, an identity validation of the network device and the SIM-less end device and an application validation of an application pertaining to the application service session establishment request;
obtaining, by the network device from the application device, a session token; and
establishing, by the network device, an application session with the application device based on a binding of the network device with the SIM-less end device and the session token.

2. The method of claim 1, wherein the binding provides that the network device and the SIM-less end device constitute an endpoint.

3. The method of claim 1, wherein the application validation pertains to a permission of access and use of the application by at least one of the network device or the SIM-less end device.

4. The method of claim 1, wherein the session token includes an identifier token pertaining to at least one of the network device or the SIM-less end device and an application token generated by the application device.

5. The method of claim 1, further comprising:
authenticating, by the network device before the receiving, the SIM-less end device.

6. The method of claim 1, wherein the application service session establishment request includes a security identifier that is generated based on an identifier of the SIM-less end device and a digital certificate issued to the SIM-less end device.

7. The method of claim 6, further comprising:
generating, by the network device, an identity profile of the SIM-less end device, wherein the identity profile includes the identifier, the security identifier, and the digital certificate; and
storing, by the network device, the identity profile.

8. The method of claim 1, wherein the network device provides non-cellular connectivity to the SIM-less end device.

9. A network device comprising:
a processor that is configured to:
   receive, from a subscriber identification module (SIM)-less end device, an application service session establishment request with an application device of an external network, wherein the network device is customer premise equipment;
   obtain, in response to the receipt of the application service session establishment request, an identity validation of the network device and the SIM-less end device and an application validation of an application pertaining to the application service session establishment request;
   obtain, from the application device a session token; and
   establish, an application session with the application device based on a binding of the network device with the SIM-less end device and the session token.

10. The network device of claim 9, wherein the binding provides that the network device and the SIM-less end device constitute an endpoint.

11. The network device of claim 9, wherein the application validation pertains to a permission of access and use of the application by at least one of the network device or the SIM-less end device.

12. The network device of claim 9, wherein the session token includes an identifier token pertaining to at least one of the network device or the SIM-less end device and an application token generated by the application device.

13. The network device of claim 9, wherein the processor is further configured to:
   authenticate, before receipt of the application service session establishment request, the SIM-less end device.

14. The network device of claim 9, wherein the application service session establishment request includes a security identifier that is generated based on an identifier of the SIM-less end device and a digital certificate issued to the SIM-less end device.

15. The network device of claim 14, wherein the processor is further configured to:
   generate an identity profile of the SIM-less end device, wherein the identity profile includes the identifier, the security identifier, and the digital certificate; and
   store the identity profile.

16. The network device of claim 9, wherein the network device provides non-cellular connectivity to the SIM-less end device.

17. A non-transitory computer-readable storage medium storing instructions executable by a processor of a network device, wherein the instructions are configured to:
   receive, from a subscriber identification module (SIM)-less end device, an application service session establishment request with an application device of an external network, wherein the network device is customer premise equipment;
   obtain, in response to the receipt of the application service session establishment request, an identity validation of the network device and the SIM-less end device and an application validation of an application pertaining to the application service session establishment request;
   obtain, from the application device, a session token; and
   establish, an application session with the application device based on a binding of the application device with the SIM-less end device and the session token.

18. The non-transitory computer-readable storage medium of claim 17, wherein the binding provides that the network device and the SIM-less end device constitute an endpoint.

19. The non-transitory computer-readable storage medium of claim 17, wherein the application validation pertains to a permission of access and use of the application by at least one of the network device or the SIM-less end device.

20. The non-transitory computer-readable storage medium of claim 17, wherein the network device provides non-cellular connectivity to the SIM-less end device.

* * * * *